Jan. 31, 1956 T. J. REESE 2,733,058
OVERLOAD SPRING
Filed Sept. 17, 1952
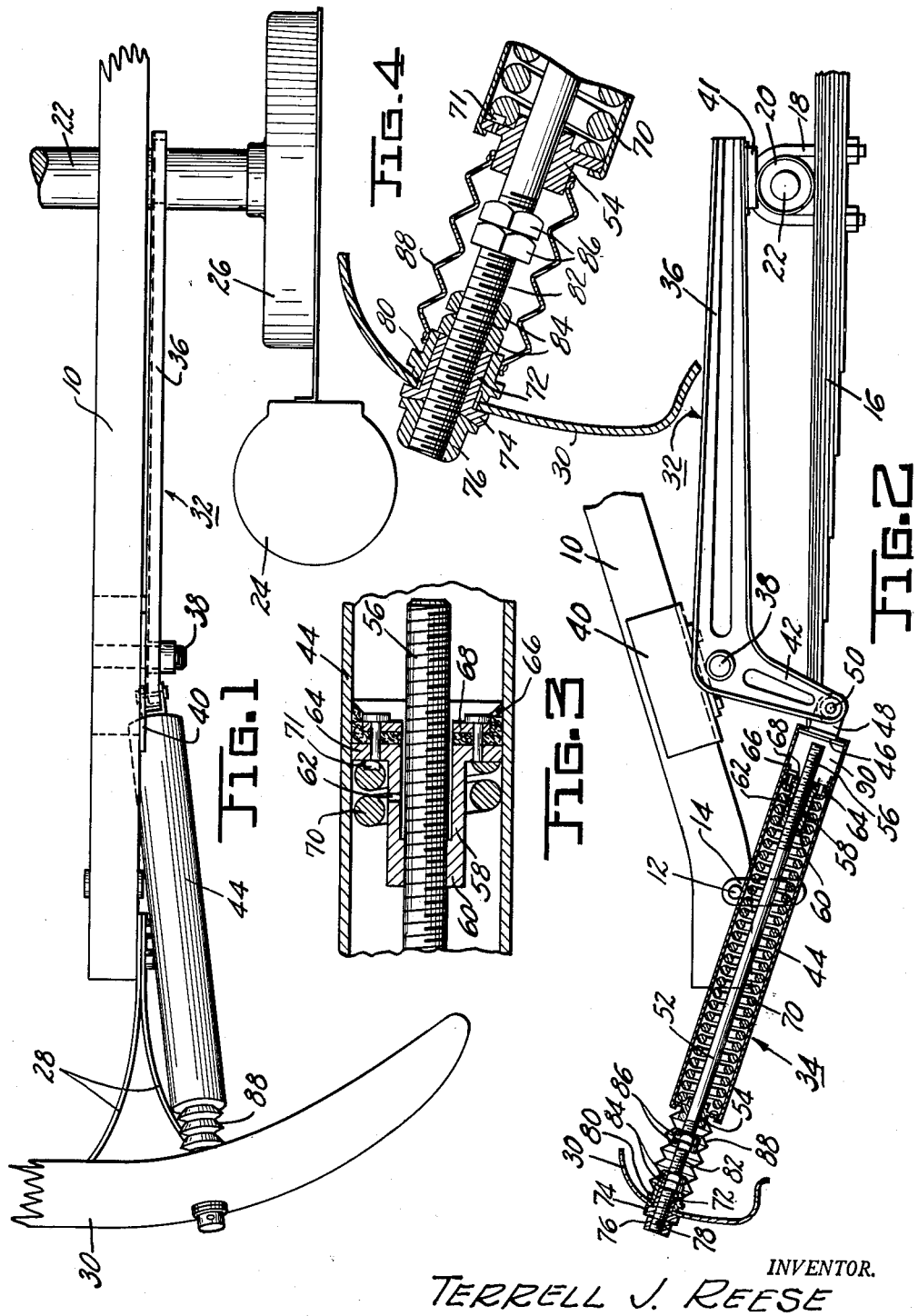
INVENTOR.
TERRELL J. REESE
BY
Eugene C. Knoblock
ATTORNEY.

United States Patent Office 2,733,058
Patented Jan. 31, 1956

2,733,058

OVERLOAD SPRING

Terrell J. Reese, Elkhart, Ind.

Application September 17, 1952, Serial No. 309,975

4 Claims. (Cl. 267—16)

This invention relates to improvements in overload springs, and is particularly applicable to automobiles and other vehicles having a body mounted upon axles by means of springs.

Overload springs are commonly employed in automobiles which are used to tow house trailers. The common method of hitching a house trailer to an automobile causes some of the weight of the trailer to be applied to the automobile. This weight is greater than the weight which the springs of the automobile were designed to carry for normal driving conditions with the automobile body in a normal attitude and preserving the benefit of the function of the springs. Overload springs are designed to permit the successful use of an automobile to tow a trailer by supplementing the strength of the automobile springs to the extent necessary to permit the automobile to ride in a normal attitude and to retain the benefit of springs when the trailer is attached.

Overload springs as heretofore constructed and employed have been of different types, but in each instance have been of a type which is permanently mounted and which acts with full effect upon the vehicle at all times. Consequently, after the trailer has been removed from the vehicle and the vehicle is driven, the springs, that is, the usual auto springs plus the overload springs, are stiffer than required for the use of the automobile alone. The auto does not function or ride properly under these circumstances and all of the jolts which are taken by the wheels, due to irregularities in the road surface, are transmitted to the body rather than being damped or eliminated by the springs. In other words, the springs are too stiff to yield as desired. The only way in which this action can be avoided with conventional equipment and conventional types of overload springs is to completely remove the overload springs. The removal of these springs is difficult and time-consuming and ordinarily is avoided except in instances where the user of the automobile does not expect to use it to tow a trailer for some time.

It is the primary object of this invention to provide an overload spring which will effectively supplement the strength of the springs of an automobile to enable it to be used to tow a trailer, and which at the same time may be adjusted to regulate the action thereof through a wide range from zero to a predetermined maximum.

A further object is to provide an overload spring whose capacity is adjustable by very small increments by a simple manipulation which can be performed without requiring the use of jacks or other means to elevate the automobile or its spring.

A further object is to provide a device of this character which avoids suspension if its weight from the axle of the automobile and, instead, is mounted upon the frame of the vehicle so that its weight is sprung both in use and when positioned in inoperative relation.

A further object is to provide a device of this character which acts between the body of the vehicle and the axle of the vehicle at the outer end of the axle and adjacent to the wheels of the vehicle.

A further object is to provide a device of this character which enables the spring action applied to each side of a vehicle body to be adjusted independently in order to compensate for unequal distribution of weight at the opposite sides of an automobile or to accommodate a difference in the strength of the springs at opposite sides of the automobile.

A further object is to provide a device of this character which is adjustable, which can be adjusted without the necessity of removal of any part from the automobile, and which can be actuated either while the automobile is empty or loaded.

A further object is to provide a device of this character which is simple in construction, easy to install, and which can be preassembled for ready mounting upon an automobile.

Other objects will be apparent from the following specification.

In the drawing:

Fig. 1 is a plan view of the device mounted upon an automobile.

Fig. 2 is a view of the device in side elevation, with parts shown in section and illustrating its relation to the parts of the automobile which it engages and with which it operates.

Fig. 3 is an enlarged fragmentary detail sectional view.

Fig. 4 is a fragmentary enlarged sectional view illustrating the connection of the device to the bumper of an automobile.

Referring to the drawing which illustrates the preferred embodiment of the invention, the numeral 10 designates a longitudinal automobile frame member to which is pivotally connected at 12 at its rear end a shackle member 14 having in turn pivotally connected thereto the rear end portion of an elongated leaf spring 16. The spring 16 is connected by suitable brackets 18 to the housing 20 of an axle 22, the same being the rear or driving axle for the automobile wheels shown schematically at 24 and including the brake drum 26. The front end of the spring will be connected to the vehicle by another spring shackle (not shown). The frame 10 fixedly mounts bracket members 28 projecting rearwardly therefrom and serving to mount a bumper member 30.

The foregoing construction is conventional and has been illustrated herein to show the orientation of the parts and to show one automotive structure with which my improved overload spring may be used. It will be understood, however, that my device is not limited to an automobile construction of the character shown but may be applied to any vehicle having a body mounted upon a supporting axle by means of springs and having a bumper or other solid structure located similarly to the usual location of an automobile bumper.

My overload spring consists of two principal parts, being a lever part 32 and a spring unit 34. The lever part 32 is in the nature of a bellcrank lever having a long arm 36 extending substantially longitudinally of the vehicle from a pivot 38 effected by means of a bracket 40 fixedly secured to the longitudinal frame member 10 of the automobile body adjacent the rear thereof and preferably spaced forwardly of the rear spring shackle 14. The longitudinal lever arm 36 preferably carries a pad of rubber or other resilient member 41 at its bottom surface and adapted to bear upon the top of the axle housing 20. The other arm 42 of the bellcrank lever projects downwardly from the pivot axis 38. The bracket 40 is preferably so constructed that the bellcrank lever may be positioned in laterally spaced relation to and slightly offset from the main vehicle frame member 10, as best seen in Fig. 1. The arms of the bellcrank will be constructed in any cross-sectional shape and size and of such material as to insure that the lever will be rigid, and, for this purpose, may be provided with flanges, ribs or of like strengthening contours. It will be understood that two bellcranks 32 will be provided located at opposite sides of the vehicle and preferably between each outer longitudinal frame member 10 and the adjacent rear wheel assembly 24, 26.

Two spring units 34 are provided, each being connected at its forward end to a bellcrank, and at its rear end to the automobile bumper. Each spring unit has an elongated tubular housing 44 having an end wall 46 fixed at one end thereof and mounting a projecting bracket 48 which is pivoted at 50 to the lower free end of the arm 42 of the bellcrank. The bellcrank arm will preferably be slightly bent or twisted to permit the tubular member 44 to extend at an angle to the frame 10 as illustrated in Fig. 1.

An elongated shaft 52 extends lengthwise and centrally through the tubular housing 44, being journaled in a bushing 54 fixedly carried by one end of the tubular housing 44 and projecting from that bushing and from the tubular housing 44. The portion 56 of the shaft 52 located within the housing 44 is screw-threaded, and a cup-shaped member 58 has an end wall 60 provided with a threaded aperture screw-threaded upon the shaft portion 56. The cylindrical wall portion 58 preferably has clearance with the shaft portion 56 and also is provided with a small aperture 62 which constitutes a bleed port.

A flange 64 is carried by and outturned from the outer end of the cylindrical portion 58 and has a cup leather or other gasket 66, which may be formed of rubber, synthetic rubber, leather or other flexible sheet material, secured thereto as by means of a retainer ring 68. The margin of this gasket is bent into substantially cylindrical shape to bear flat against the inner surface of the tubular housing 44 around its circumference and projecting in the direction of the end wall 46. The housing 44 is adapted to contain oil or other liquid, and the cup leather provides a seal against flow of such liquid from the chamber at the right-hand side of the cup leather to the left-hand side thereof as viewed in Fig. 2, and accommodates flow of fluid therepast upon reverse action. A coil spring 70 is confined within the housing 44, bearing at one end against the flange 64, and at the other end against the bushing 54. Each end of the spring is preferably provided with a notch adapted to receive a pin or other projection 71 carried by the adjacent one of the two abutment members 54 and 64 so that said spring is restrained from rotation, and the member 60–64 is likewise restrained from rotation.

The shaft 52 is of a length to project from the bushing 54 and pass through an aperture in the automobile bumper 30, as through one of the apertures normally used to receive a bolt for the bumper-mounting bracket 28. The aperture in the bumper is preferably larger than the cross-sectional size of the shaft 52 in order to receive a tubular member 72 which rotatably receives and journals the shaft 52 and which is provided with an out-turned flange 74 at its outer end bearing against the outer or rear surface of the bumper and providing a socket for a nut 76 upon the end of the shaft 52 and preferably secured thereon against rotation as by means of the pin 78.

The sleeve 72 will preferably be externally screw-threaded and receives a tubular fitting 80 adapted to serve as a clamp to hold the sleeve 72, 74 fixed upon the bumper 30. The end portion 82 of the shaft is screw-threaded and one or more nuts 84, preferably acting as lock nuts, are threaded upon the shaft 82 into end bearing abutment with the sleeves 72 and 80. A second lock nut or set of lock nuts 86 is threaded on the shaft portion 82 intermediate the lock nut 84 and the bushing 54 and preferably spaced from both as shown. An accordion type tubular flexible seal 88 is anchored at one end to the bushing 54 and at its opposite end to the nut 80.

The device can be preassembled or prefabricated as a unit and can be installed upon an automobile very simply and easily and without need for elevating the automobile as by means of jacks. Thus, to install the device, the bushing 72, 74 is inserted in an opening in the bumper 30 and the locking sleeve 80 is screw-threaded thereon to clamp the parts in place. The end of the shaft 52 with its head 76 removed is passed through the bore of the bushing 72, and the head 76 is then mounted upon the end of the shaft. If desired, the end of the shaft may be threaded to supplement the function of the pin 78 to secure the head upon the shaft. In this connection, it is necessary that the head 76 be fixed upon the shaft in rotation-transmitting relation and hence the use of the pin 78 or some other means to key these parts together is desirable.

The head 76 has a configured external shape, such as a hexagonal shape, to accommodate its rotation by means of a tool. The inner end of the nut 76 and the surface of the flange 74 which it engages are both preferably part-spherical so that a certain amount of adjustment of the angular position of the shaft with reference to the bumper is accommodated. The bellcrank lever 32 is then secured to the automobile body as by means of the brackets 40, care being taken to insure the position of the elongated arm 36 of the lever above the axle 20, 22. If the lever 32 and the spring unit 34 are not connected as a unit, they will then be connected at the pivot 50 and installation of the device will then be completed.

Adjustment of the device as between a position sustaining no force and a position in which the spring 70 comes into play, is effected by rotating the head 76. As the head 76 is rotated, the shaft 52 is rotated and the longitudinal position of the unit 58—68 within the housing 44 is varied. This rotation of the shaft in one direction will move the member 58—68 toward the right-hand end of the housing 44 as viewed in Fig. 2, and will release the tension of the spring 70. Opposite rotation of the head 76 and the shaft 52 will move the unit 58—68 toward the left, thus increasing the tension upon the spring 70. The spring will be of a normal length such that it is fully extended when the unit 58—68 approaches the right-hand end wall 46 of the housing 44. The unit 58—68 may be urged into engagement with the end wall 46 and, because of its cup-shape as shown, may be advanced to project a substantial distance beyond the end of the shaft 52. This action serves to move the tubular frame 44 bodily toward the right, thereby acting against the lower free end of the bellcrank arm 42 and causing the bellcrank arm 36 to swing upwardly to a position above and clear of the axle 20, 22. The arm will be held in that position entirely free of the axle, exerting no force thereon and also accommodating flexing of the spring 16 with resultant varying in the spacing between the axle 20, 22 and the frame 10.

When it is desired that the spring 70 shall be brought into play, the head 76 and the shaft 52 are rotated in a manner to move the spring-engaging unit 58—68 toward the left along the shaft 44. Assuming that this proceeds from a starting position in which the lever 36 is elevated clear of the axle 20, 22, the first result of such rotation will be to permit the tubular housing 44 to move toward the left to the position illustrated in Fig. 2, thereby lowering the arm 36 into engagement with the axle 20, 22 at its pad 41. Subsequent rotation of the shaft in the same direction acts to compress the coil spring 70, thus progressively increasing the force of the spring which is exerted upon the lever 36. It will be observed that, since there is a screw-threaded adjustment of the spring-compressing means, there is possible a very fine adjustment of spring compression so that the user may adjust the spring with great accuracy. In this connection it will be apparent that each of the two units at the opposite sides of the car may be adjusted individually, and, consequently, if there is any tendency for the car to ride unevenly under any given load, that tendency can be compensated quickly by relative adjustment of the two devices at the two sides of the car, either increasing the compression of the spring at one side or reducing the compression of the spring at the other side, or adjusting both springs until a balance is effected. This is particularly desirable in instances where heavy loads are carried in the trunk of an automobile and the automobile is not loaded to balance the application of weight at the two sides thereof. For instance, if heavy metal units, such as metal working dies or permanent casting molds, are carried in an automobile, it may not be possible to position them to distribute the weight equally, but the present device will permit the overload spring to be tightened and its effect increased at the side which is subjected to greatest stress, thereby restoring the automobile body to balance and fully compensating for the unbalanced weight distribution.

When the overload device comes into play, the action which results is a tendency of the spring 70 to pull the tubular body toward the left with sliding of its bushing 54 upon the shaft 52, thereby tending to swing the lever 32 clockwise as viewed in Fig. 2. This movement of the device is accommodated by the accordion seal 88 and by the sliding of the unit 58—68 within the tubular housing 44. As the vehicle moves, any irregularities in the road tend to cause the wheels to bounce and move the axle 20 upwardly. That action is transmitted through the bellcrank lever housing 44, tending to move it toward the right and thus further compress the spring 70 because the abutment 58—68 thereof is fixedly positioned upon the rod 52, and the rod 52 in turn is fixedly connected to the bumper 30 which is fixedly related to the automobile frame 10 by the bumper brackets 28.

The housing 44 contains oil or other liquid and thus serves to somewhat damp the action of the overload device. Thus, assuming that the wheels have passed over an obstacle which has caused them to bounce upwardly, with the result that the lever 32 has pulled the housing 44 to the right to compress the spring, it will be apparent that this increases the size of the oil-containing chamber 90 at the right-hand end of the cylinder 44, and oil located at the left-hand end of the cylinder is free to pass around the gasket 66 in order to enter the chamber 90. Upon rebound, however, the gasket 66 serves as a check valve or one-way valve to prevent the return flow of oil therepast, and the flow of oil from the chamber 90 back to the spring-containing chamber of the tubular housing 44 is limited by the size of the bleed port 62. Thus the device introduces a shock absorbing action in addition to an overload stress sustaining action.

The lock nuts 84 and 86 both serve important functions in the device. The lock nut 84 serves as an abutment which acts, when the overload spring is released, to hold the shaft 52 against rearward sliding. In other words, since the shaft 52 is fixed in longitudinal position by the lock nut 84, the releasing action resulting from movement of the housing 44 to the right, as above explained, by engagement of the spring tension adjuster 58—68 toward the right and pressure thereof against the housing wall 46 thus results solely in pivoting of the lever. The function of the nuts 86, on the other hand, is to limit the swing of the parts as a jack acts on the body to elevate the car, as for the purpose of changing a tire. It will be apparent that as the body is elevated by a jack acting upon the chassis or bumper of a car, the normal spacing between the axle and the chassis increases because of the release of pressure upon the springs 16. This action permits the lever arms 36 to tilt downwardly from the pivot axis 38 because of the spring tension exerted thereon by the spring 70 which acts to move the housing 44 toward the left upon the shaft 52. The limit to which this action can occur is determined by the positioning of the lock nut 86.

The following characteristics of the device are to be noted. When the device is operated to entirely release the overload spring, that is, to space the lever arm 36 clear of the axle, the spring 16 is free to function in its normal condition, and the present device will not affect the riding qualities of the automobile except to the extent that the weight of the device is added to the load in the automobile and thus will have some slight, although negligible, effect upon the riding properties of the automobile.

The device is sealed throughout, and particularly at the sliding fit of the shaft 52 in the bushing 54, by means of the accordion seal 88, thus making the use of liquid in the device feasible, and also utilizing the liquid to maintain the device in a lubricated condition so that squeaks and noise are minimized.

The device permits the application of the pressure of the overload springs upon the axle near the wheels, thereby avoiding tendency to distort the axle housing or the axle shaft.

The device can be actuated without requiring elevation of the car upon a jack and by the use of a simple tool by a person standing behind and clear of the car.

While the preferred embodiment of the invention has been illustrated and described herein, it will be understood that changes in the construction may be made within the scope of the appended claims without departing from the spirit of the invention.

I claim:

1. An overload spring for a vehicle having a body mounting a bumper and supported on springs carried by an axle unit, comprising a bellcrank lever pivoted to said body and having a depending end portion and an end portion adapted to bear on said axle, and an elongated spring unit connected at one end to the depending portion of said bellcrank and at its other end to said bumper, said spring unit urging said lever against said axle to supplement the action of said vehicle spring, said spring unit comprising a shaft secured at one end to said bumper and mounting an abutment, a housing slidable on said shaft and connected at one end to said lever, and a coil spring in said housing encircling said shaft, said spring bearing against said abutment and against an end of said housing.

2. An overload spring for a vehicle having a body mounting a bumper and supported on springs carried by an axle unit, comprising a bellcrank lever pivoted to said body and having a depending end portion and an end portion adapted to bear on said axle, and an elongated spring unit connected at one end to the depending portion of said bellcrank and at its other end to said bumper, said spring unit urging said lever against said axle to supplement the action of said vehicle spring, said spring unit comprising a shaft secured at one end to said bumper and mounting an abutment, a housing slidable on said shaft and connected at one end to said lever, and a coil spring in said housing encircling said shaft, said spring bearing against said abutment and against an end of said housing, said abutment constituting a piston having a check valve and a vent port, said housing containing a liquid.

3. An overload spring for a vehicle having a body mounting a bumper and supported on springs carried by an axle unit, comprising a bellcrank lever pivoted to said body and having a depending end portion and an end portion adapted to bear on said axle, and an elongated spring unit connected at one end to the depending portion of said bellcrank and at its other end to said bumper, said spring unit urging said lever against said axle to supplement the action of said vehicle spring, said spring unit comprising a shaft secured at one end to said bumper and mounting an abutment, a housing slidable on said shaft and connected at one end to said lever, and a coil spring in said housing encircling said shaft, said spring bearing against said abutment and against an end of said housing, said abutment having a threaded fit on said shaft and said shaft having a configured head to accommodate rotation thereof.

4. An overload spring for a vehicle having a body mounting a bumper and supported on springs carried by an axle unit, comprising a bellcrank lever pivoted to said body and having a depending end portion and an end portion adapted to bear on said axle, and an elongated spring unit connected at one end to the depending portion of said bellcrank and at its other end to said bumper, said spring unit urging said lever against said axle to supplement the action of said vehicle spring, said spring unit comprising a shaft secured at one end to said bumper and mounting an abutment, a housing slidable on said shaft and connected at one end to said lever, and a coil spring in said housing encircling said shaft, said spring bearing against said abutment and against an end of said housing, and a fitting adapted to be carried by said bumper to rotatably receive said shaft and restrain said shaft against endwise movement.

References Cited in the file of this patent

UNITED STATES PATENTS

| | | |
|---|---|---|
| 593,788 | Stone | Nov. 16, 1897 |
| 1,027,193 | Farver | May 21, 1912 |
| 1,033,348 | Rimailho | July 23, 1912 |
| 1,489,336 | Wilkinson | Apr. 8, 1924 |
| 1,641,472 | Brown | Sept. 6, 1927 |
| 1,689,884 | McComb | Oct. 30, 1928 |
| 2,010,623 | Bugatti | Aug. 6, 1935 |
| 2,124,692 | Fermier et al. | July 26, 1938 |
| 2,144,118 | Mitchell | Jan. 17, 1939 |
| 2,201,280 | Yantes | May 21, 1940 |
| 2,238,202 | Wood | Apr. 15, 1941 |

FOREIGN PATENTS

| | | |
|---|---|---|
| 801,423 | Germany | Jan. 8, 1951 |